Aug. 27, 1957 — L. O'RUSSA — 2,804,288
BOWL SUPPORT MIXER

Filed Jan. 22, 1954 — 2 Sheets-Sheet 1

INVENTOR.
Lorence O'Russa
BY
Ahlberg, Hueffer & Gradolph
ATTYS.

Aug. 27, 1957  L. O'RUSSA  2,804,288
BOWL SUPPORT MIXER

Filed Jan. 22, 1954  2 Sheets-Sheet 2

INVENTOR.
Lorence O'Russa
BY
ATTYS.

United States Patent Office 2,804,288
Patented Aug. 27, 1957

2,804,288

BOWL SUPPORTED MIXER

Lorence O'Russa, Peoria, Ill.

Application January 22, 1954, Serial No. 405,558

2 Claims. (Cl. 259—104)

The present invention relates to electric food mixers for household use.

Such mixers have been developed generally along two lines, which may be characterized as stand type mixers and as portable mixers. In general, mixers of both types comprise a beater unit including a pair of beaters journaled in a casing which houses the motor and drive for the beaters.

The beater unit of a stand type mixer is normally mounted on a stand which supports a mixing bowl below the beaters. The portable type mixer comprises a beater unit ordinarily equipped with a handle to facilitate manual support of the mixer during mixing operations. The beater units of some stand type mixers have handles for using the units independently of the support stands in the same manner as portable mixers.

Portable mixers require far less storage space than bulky stand type mixers. Also, the first cost of portable mixers is only approximately half that of complete stand type mixers.

However, these advantages of the portable type mixer have heretofore been offset to a large extent by the necessity for manually supporting the mixer throughout a mixing operation, thus keeping the user from other tasks. Moreover, the use of a portable mixer becomes quite tiresome—most recipes require mixing from three to nine minutes or more.

One object of the invention is to provide an improved household food mixer which affords most of the advantages of both the conventional stand type mixer and the portable type mixer at far less cost than the stand type mixer.

More specifically stated, another object of the invention is to provide an improved household food mixer in which a beater unit, essentially a conventional portable mixer, is supported on the rim of a mixing bowl by extremely simple, economical means which provides for free radial and circumferential movement of the mixer beaters over the entire bottom surface of the bowl.

Another object is to provide an improved mixer of the character recited in which a conventional beater unit is supported on a mixing bowl by a simple mount on the bowl rim and an unobtrusive bracket on the unit which provide for free lifting of the unit into and out of supported position on the mount.

In conjunction with the previous objects, an additional object is to provide a mixer having a bowl supported beater unit that can be tilted upwardly to an inoperative position or rocked up and down to work the beaters vertically in the mixer bowl without overturning the bowl.

Other objects and advantages will become apparent from the following description of the form of the invention shown in the drawing, in which.

Figure 1:
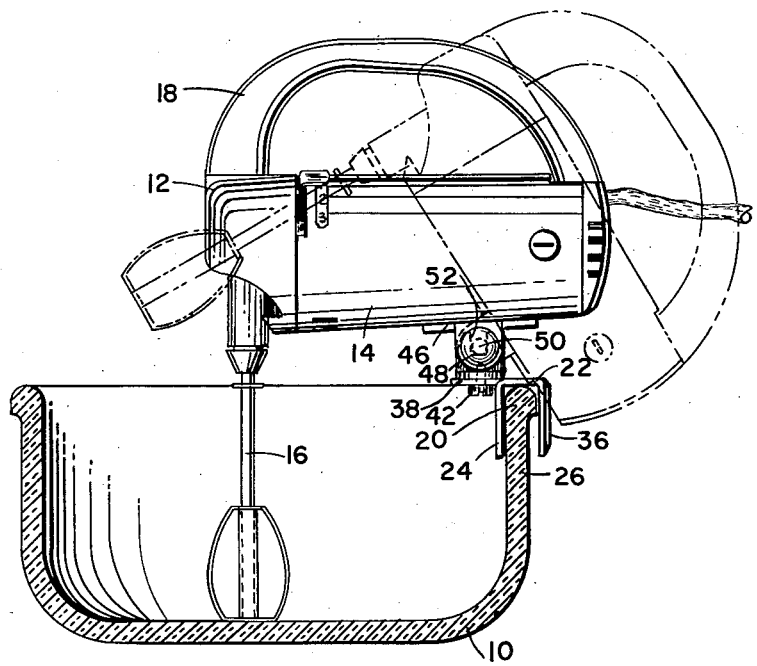
Figure 1 is a side view, partially in section, showing a bowl supported mixer incorporating the invention and illustrating in phantom the tilted position of the beater unit of the mixer.

The bowl supported mixer forming the illustrated embodiment of the invention comprises a conventional mixing bowl 10 and a beater unit 12 formed by a conventional portable type mixer. The beater unit 12 includes an elongated case 14 containing a motor and drive for a pair of beaters 16 extending downwardly from one end of the case generally at right angles to the case. A suitable handle 18 is secured to the upper side of the case.

The beater unit 12 is supported on the rim 20 of the bowl 10 by simple mounting structure which provides for free circumferential and radial movement of the beaters 16 over the bottom of the bowl and also for tilting movement of the beater unit to a raised, inoperative position.

The support structure provided for this purpose includes a horizontally elongated support runner 22 adapted for free sliding movement along the bowl rim 20. Fashioned from a single piece of sheet metal, the runner 22 comprises a vertical heel 24 of substantially greater horizontal length than height curved to rest against the inner surface of the mixing bowl wall 26. Two elongated strips 28 on the sheet metal blank from which the runner 22 is formed join the upper edge of the heel 24 at right angles, Fig. 2. Located at opposite ends of the heel 24, the strips 28 are each bent over to form horizontal support rests 30, 32 extending radially across the bowl rim 20. At the outer ends of the rests 30, 32, the respective strips 28 are turned downwardly to form vertical legs 34, 36 spaced from the heel 24.

A horizontal ledge 38 located between the two support rests 30, 32 is turned inwardly from the upper edge of the heel 24. A short, upright standard 40 having a circular base is swiveled to the ledge 38 by a retaining screw 42 extending upwardly through an aperture 44 in the ledge and threaded into the lower end of the standard. The screw 42 is tightened sufficiently to hold the standard 40 steady on the ledge 38 without binding, thus providing for free turning movement of the standard about a vertical axis.

The beater unit 12 is supported on the standard 40 by means of a bracket 46 attached to the underside of the case 14 in spaced relation to the beaters 16. Two depending ears 48 on the bracket 46 are laterally spaced from each other in vertical planes parallel to the axis of elongation of the case 14. These ears straddle a receiver formed by the upper end of the swiveled standard 40, which is flattened on opposite sides 49 to work between the ears with a sliding fit.

A transverse pivot pin 50 extending between the lower ends of the two ears 48 bears in the lower end of an upwardly open vertical slot 52 cut into the upper end of the standard 40. The extreme upper end of the standard 40 between the two flats 49 is rounded toward the opening into the slot 52.

When mounted on the mixing bowl 10, the beater unit 12 is supported against lateral tilting movement by the slidable engagement of the bracket ears 48 with the two flats 49 in the standard 40. The length of the rim supported runner 22 is just sufficient to assure a steady support base for the beater unit 12 without clamping the runner to the bowl 10.

The pivot pin 50, which bears in the bottom of the slot 52 in the standard 40, is located somewhat outwardly of the center of gravity of the beater unit 12 so that the beaters 16 rest lightly on the bottom of the mixing bowl when the beater unit 12 is mounted in the position shown in solid lines in Fig. 1. Thus, the mixer can be left unattended to carry out a mixing operation once the beater unit is mounted on the mixing bowl.

Figure 2:
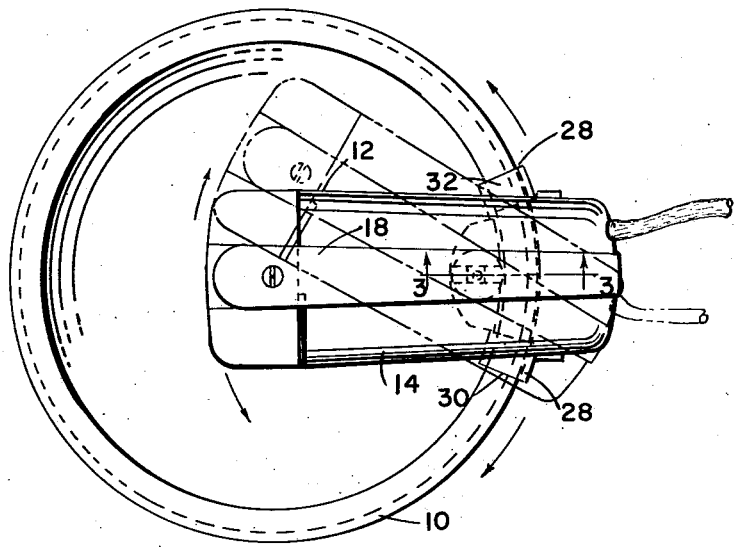
Fig. 2 is a plan view of the mixer of Fig. 1 showing the beater unit centered in the bowl and illustrating the free circumferential and radial movement of the beater unit by arrows and a phantom reproduction of the unit.
Figure 4:
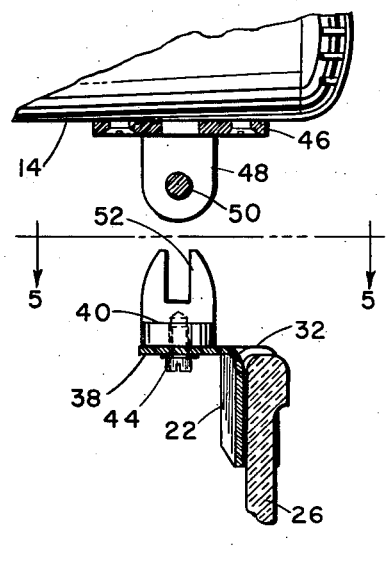
Fig. 4 is a fragmentary view similar to Fig. 3 but showing the beater unit lifted upwardly from its bowl support.
Figure 3:
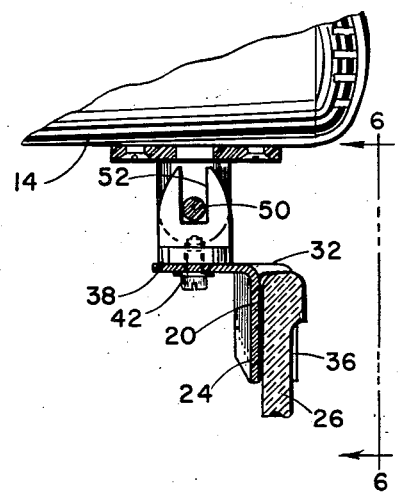
Fig. 3 is a fragmentary sectional view on a somewhat enlarged scale taken generally along the line 3—3 of Fig. 2.
Figure 5:
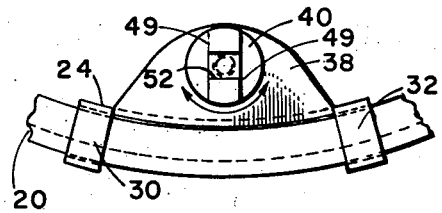
Fig. 5 is a fragmentary view taken along line 5—5 of Fig. 4.
Figure 6:
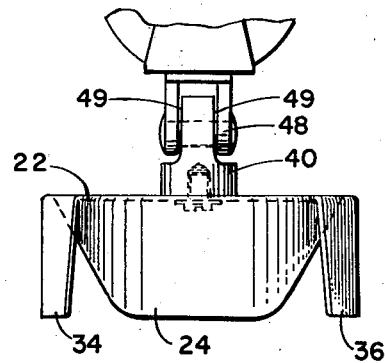
Fig. 6 is a fragmentary view taken along line 6—6 of Fig. 3.

The beaters 16 can be moved radially across the mixing bowl 10 by swinging the beater unit about the vertical axis of the swiveled support standard 40, as indicated by the arrows in Fig. 2. Also, the beaters can be moved circumferentially around the bottom of the bowl 10 by applying a light horizontal force to the handle 18 to move the runner 22 around the bowl rim 20. Thus the beater unit can be set to operate unattended in any position in the beater bowl or moved radially and circumferentially over the bowl bottom.

It will be noted that the height of the bowl 10 is such that the beater unit case 14 is disposed in a substantially horizontal position when the beaters touch the bottom of the bowl (see Fig. 1).

The beater unit 12 may be swung upwardly on the pivot pin 50 to work the beaters 16 vertically in the bowl 10 or to move the unit upwardly to its tilted, inoperative position shown in phantom in Fig. 1.

The location of the support standard 40 in a radially inward position on the runner 22 in relation to the mixing bowl 10 enables the bowl to support the beater in its raised, inoperative position without overturning.

To mount the beater unit 12 on the bowl 10 the user has only to slip the runner 22 over the bowl rim 20 and set the beater unit in place. (The support pin 50 moves vertically downward into the standard slot 52.) The bracket 46 and the standard 40 together form a freely separable connection between the beater unit 12 and the runner 22 which enables the user to lift the unit from the runner at any time without restriction. The unobtrusive bracket 46 does not interfere with the use of the beater unit 12 as a portable hand supported mixer.

Moreover, the beater unit 12 with the attached support bracket 46 may be stored as easily as a portable mixer. The runner and standard assembly 22, 40 occupy very little storage space.

The very simple structure used in supporting the beater unit on the bowl rim adds little to the cost of the bowl supported mixer as compared to a conventional portable mixer. Moreover, the bowl supported mixer provided has substantially all the advantages of both the portable type mixer and the stand type mixer.

While I have shown and described a preferred embodiment of my invention, it will be apparent that variations and modifications thereof may be made without departing from the principles and scope of the invention. I therefore desire, by the following claims, to include all such variations and modifications by which substantially the results of my invention may be obtained through the use of substantially the same or equivalent means.

I claim:

1. A bowl supported mixer comprising, in combination, an upwardly open mixing bowl having an upwardly extending annular wall including at the extreme upper end thereof a circular rim, a horizontally elongated support runner of arcuate shape adapted to rest slidably on said bowl rim, said support runner including depending members on opposite sides thereof horizontally spaced transversely with respect to the runner to embrace the inner and outer surfaces of the bowl wall, the horizontal spacing between said depending members on opposite sides of said runner being somewhat greater with respect to the horizontal center of the bowl than the horizontal thickness of the portion of the bowl wall embraced by the depending members when the runner is resting on the bowl rim thus avoiding binding between the depending runner members and the bowl wall, a motorized beater unit including a horizontally elongated case and a pair of beaters depending from one end thereof, swivel support means for said beater unit including first means on the beater unit horizontally spaced from said beaters and including second means on said runner, said first and second means being shaped for freely separable engagement together as an incident to lowering of said beater unit and said first means thereon onto said second means, and said swivel support means having coacting parts defining a vertical swivel axis and formed to swivel relative to each other about said axis to provide for horizontal swinging movement of said unit relative to said runner.

2. Motorized mixing means adapted to be supported on a mixing bowl for free effective movement circumferentially and radially in relation to the bowl and comprising, in combination, a horizontally elongated support runner adapted to rest slidably on the upper edge of a mixing bowl wall, said support runner including depending members on opposite sides thereof transversely spaced sufficiently with respect to the runner to embrace without binding the inner and outer surfaces of the bowl wall, a motorized beater unit including a horizontally elongated case and a pair of beaters depending from one end thereof, swivel support means for said beater unit including first means on the beater unit horizontally spaced from said beaters and including second means on said runner, said first and second means being shaped for freely separable engagement together as an incident to lowering of said beater unit and said first means thereon onto said second means, and said swivel support means having coacting parts defining a vertical swivel axis and formed to swivel relative to each other about said axis to provide for horizontal swinging movement of said unit relative to said runner.

References Cited in the file of this patent

UNITED STATES PATENTS

| | | |
|---|---|---|
| 2,013,783 | McLoughlin | Sept. 10, 1935 |
| 2,032,571 | Gilbert et al. | Mar. 3, 1936 |
| 2,317,098 | Gough | Apr. 20, 1943 |
| 2,578,901 | Schmidt | Dec. 18, 1951 |